(12) United States Patent
Rosenboom

(10) Patent No.: US 9,516,803 B1
(45) Date of Patent: Dec. 13, 2016

(54) TAMPING WHEEL

(71) Applicant: Lyn A. Rosenboom, Clifton, IL (US)

(72) Inventor: Lyn A. Rosenboom, Clifton, IL (US)

( * ) Notice: Subject to any disclaimer, the term of this patent is extended or adjusted under 35 U.S.C. 154(b) by 45 days.

(21) Appl. No.: 14/616,799

(22) Filed: Feb. 9, 2015

Related U.S. Application Data

(60) Provisional application No. 61/937,753, filed on Feb. 10, 2014.

(51) Int. Cl.
*A01C 5/06* (2006.01)

(52) U.S. Cl.
CPC .................... *A01C 5/066* (2013.01)

(58) Field of Classification Search
CPC ....... A01C 5/066; A01C 5/068; A01B 27/005; A01B 13/02; A01B 13/025; A01B 13/00; A01B 35/28; A01B 39/14; A01B 49/037
See application file for complete search history.

(56) References Cited

U.S. PATENT DOCUMENTS

| | | | | |
|---|---|---|---|---|
| 323,266 A * | 7/1885 | Bradley | .................. | A01B 35/16 172/552 |
| 357,842 A * | 2/1887 | Lubin | .................. | A01B 49/027 172/151 |
| 440,015 A * | 11/1890 | Clark | .................. | A01B 29/043 172/539 |
| 827,587 A * | 7/1906 | Warner | .................. | A01C 5/068 172/538 |
| 1,040,041 A * | 10/1912 | Slomski | .................. | A01B 39/08 172/158 |
| 1,203,060 A * | 10/1916 | Scull | .................... | A01B 29/043 172/539 |
| 1,375,185 A * | 4/1921 | Seiter | .................... | A01B 29/02 180/20 |
| 2,288,110 A * | 6/1942 | Schmeiser | .......... | A01B 29/041 172/177 |
| 2,687,683 A * | 8/1954 | Chattin | ................ | A01B 29/048 172/552 |
| 2,731,900 A * | 1/1956 | Oehler | .................. | A01C 5/068 152/453 |
| 2,734,439 A * | 2/1956 | Padrick | .................. | A01B 49/04 111/121 |
| 3,124,202 A * | 3/1964 | Van Dyk | ................ | A01B 29/04 111/195 |
| 3,202,221 A * | 8/1965 | Monk | .................. | A01B 33/021 172/119 |
| 3,692,120 A * | 9/1972 | Cline | .................. | A01B 49/027 172/151 |
| 3,910,356 A * | 10/1975 | van der Lely | ....... | A01B 29/048 172/49.5 |
| 4,006,781 A * | 2/1977 | van der Lely | ....... | A01B 49/025 172/49.5 |

(Continued)

*Primary Examiner* — Matthew D Troutman
*Assistant Examiner* — Jessica H Lutz
(74) *Attorney, Agent, or Firm* — Philip L. Bateman

(57) ABSTRACT

An adjustable tamping wheel forms a berm of a desired cross section over a recently filled trench. The tamping wheel contains a center spindle, an offset left spindle, an offset right spindle, a freely rotating center basket on the center spindle with transverse tamping members, a freely rotating left basket on the left spindle with inwardly converging transverse tamping members, and a freely rotating right basket on the right spindle with inwardly converging transverse tamping members.

2 Claims, 5 Drawing Sheets

(56) References Cited

U.S. PATENT DOCUMENTS

| | | | | |
|---|---|---|---|---|
| 4,438,819 A | * | 3/1984 | Ryals | .................. A01B 29/00 |
| | | | | 172/176 |
| 6,330,922 B1 | * | 12/2001 | King | .................. A01B 13/025 |
| | | | | 172/166 |
| 6,761,120 B2 | | 7/2004 | Kovach et al. | |
| 6,871,709 B2 | | 3/2005 | Knobloch | |
| 7,562,517 B1 | * | 7/2009 | Kornecki | ............... A01B 29/04 |
| | | | | 172/554 |
| 7,866,270 B2 | | 1/2011 | Ankenman | |
| 7,997,826 B2 | * | 8/2011 | Dufty | .................. A01B 29/02 |
| | | | | 404/125 |
| 8,074,728 B2 | * | 12/2011 | Kovach | ................. A01B 49/02 |
| | | | | 172/166 |
| 8,695,721 B2 | * | 4/2014 | Phely | .................. A01B 29/043 |
| | | | | 152/209.12 |

* cited by examiner

TAMPING WHEEL

CROSS-REFERENCE TO RELATED APPLICATION

This application claims the benefit of U.S. Provisional Application Ser. No. 61/937,753, Feb. 10, 2014.

FIELD OF THE INVENTION

This invention relates to farming. More particularly, this invention relates to row units for the tillage, planting, and fertilization of farmland.

BACKGROUND OF THE INVENTION

It is well known that crops such as corn and soybeans grow best in soil that is loose, rich in nutrients, and free of debris. After a crop is harvested, the soil is often compacted, depleted of nutrients, and full of crop residue and other debris. To restore the soil to optimal conditions, the soil is often tilled immediately before planting. Tilling is also known as cultivating or plowing (also spelled "ploughing"). The soil may also be tilled immediately after harvest. The conventional method of tillage is to treat the entire field. More recently, it has become popular to treat only the narrow strips of soil that will contain the seed rows. This method of tillage is commonly known as strip tillage or zone tillage. Strip tillage saves time and energy and reduces erosion.

Strip tillage is performed by driving a tractor through the field pulling a wheeled toolbar to which multiple implements are attached. The implements are commonly known as row units. The implements are spaced apart to correspond to the seed rows that will be planted. Each implement clears crop residue and other debris with cleaning disks, creates a trench (also known as a furrow) in the soil with a knife (also known as a blade) into which the seeds are deposited if planting is being conducted, and then fills in the trench with closing disks to create a raised berm where the trench had been formed. Many implements also include one or more tamping wheels at the rear that tamp the berm to the desired density and cross section. Tamping wheels on farm implements are sometimes known as reels, rollers, or compactors.

A variety of tillage implements containing tamping wheels have been disclosed. Such tillage implements are disclosed in Kovach et al., U.S. Pat. No. 6,761,120, Jul. 13, 2004; Knobloch, U.S. Pat. No. 6,871,709, Mar. 29, 2005; and Ankenman, U.S. Pat. No. 7,866,270, Jan. 11, 2011. The Knobloch et al. tamping wheel contains a plurality of concave bars having a shape that creates a desired cross section for the berm. The Knobloch et al. tamping wheel is not adjustable.

Although a variety of tamping wheels are known, there continues to be a demand for an improved tamping wheel. More particularly, there is a demand for a tamping wheel that is easily adjustable to form a berm having a desired cross section over a recently filled trench.

SUMMARY OF THE INVENTION

The general object of this invention is to provide an improved tamping wheel for farm implements. A more particular object is to provide a tamping wheel that is easily adjustable to create a berm having a desired cross section over a recently filled trench.

I have invented an improved adjustable tamping wheel for forming a berm of a desired cross section over a recently filled trench. The tamping wheel comprises: (a) a center spindle defining a first horizontal axis; (b) an offset left spindle attached to the center spindle and defining a second horizontal axis; (c) an offset right spindle attached to the center spindle and being in the second horizontal axis defined by the left spindle; (d) a freely rotating center basket on the center spindle, the center basket comprising: (i) a disc defining a plane perpendicular to the horizontal axis defined by the center spindle, the disc having an outer edge and a circumference; and (ii) a plurality of horizontal transverse tamping members attached along the outer edge; (e) a freely rotating left conical basket on the left spindle, the left basket comprising: (i) an inner ring having an outer edge with a circumference less than the circumference of the disc of the center basket; (ii) an outer ring having an outer edge with a circumference greater than the circumference of the disc of the center basket; and (iii) a plurality of inwardly converging transverse tamping members extending from the outer ring to the inner ring; (f) a freely rotating right conical basket on the right spindle, the right basket comprising: (i) an inner ring having an outer edge with a circumference less than the circumference of the disc of the center basket; (ii) an outer ring having an outer edge with a circumference greater than the circumference of the disc of the center basket; and (iii) a plurality of inwardly converging transverse tamping members extending from the outer ring to the inner ring; and (g) a means for adjustably fixing the distance between the left conical basket and the right conical basket.

The tamping wheel of this invention is easily adjusted to create a berm having a desired cross section.

DETAILED DESCRIPTION OF THE INVENTION

1. The Invention in General

Figure 1:
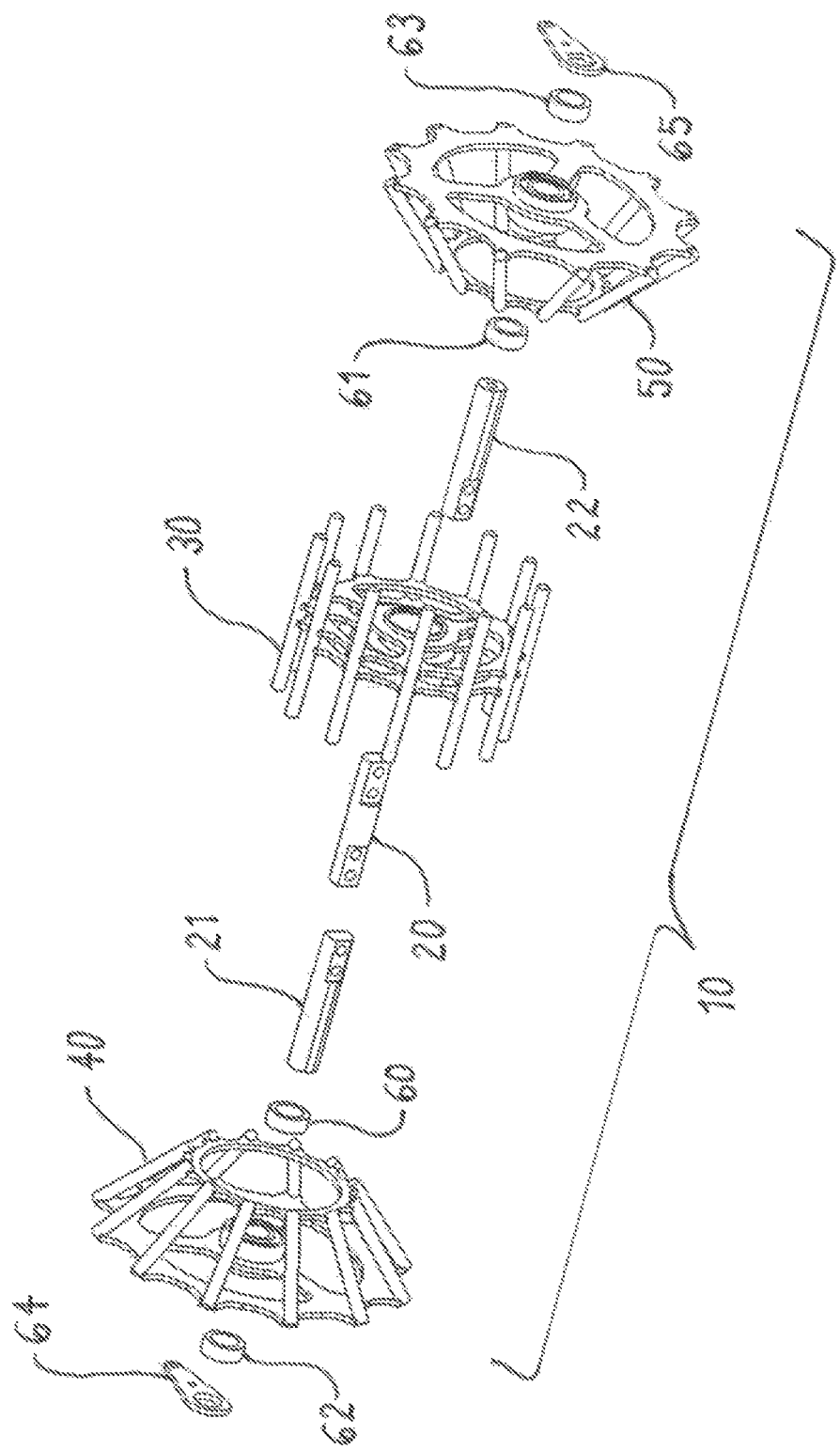
FIG. 1 is an exploded perspective view of the preferred embodiment of the tamping wheel of this invention.
Figure 2:
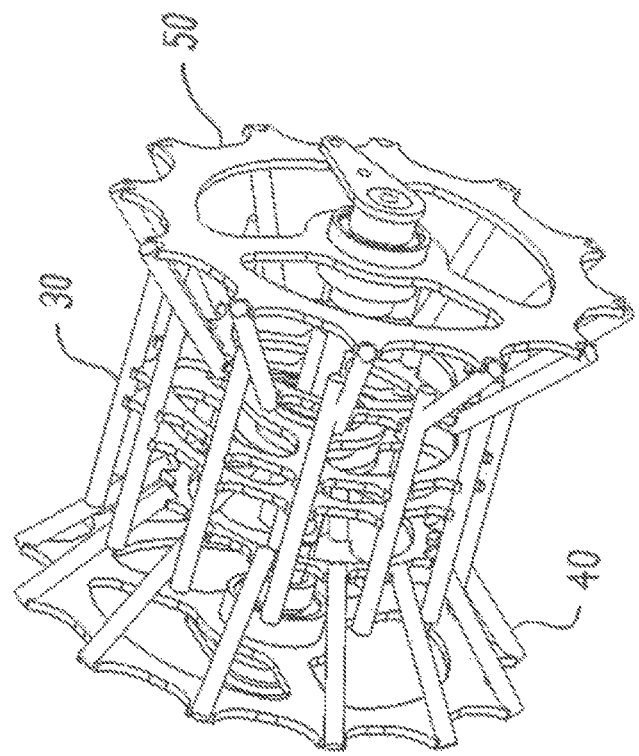
FIG. 2 is an assembled perspective view thereof.
Figure 3:
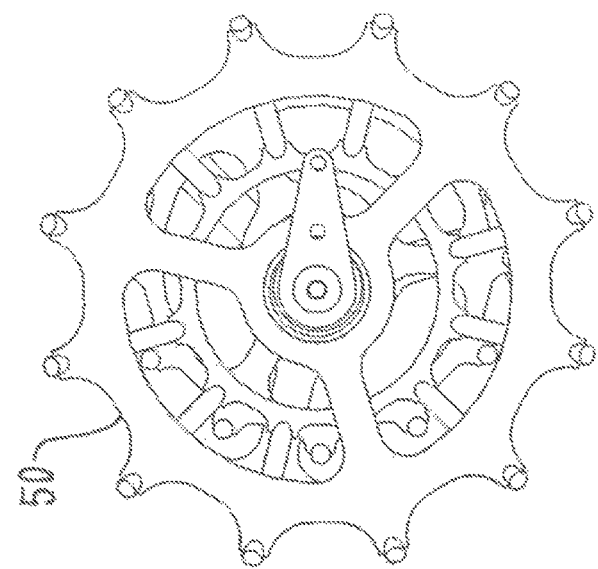
FIG. 3 is a side elevation view thereof.

This invention is best understood by reference to the drawings. Referring first to FIGS. 1 to 5, the preferred embodiment of the tamping wheel 10 of this invention comprises a center spindle 20, a left spindle 21, a right spindle 22, a center basket 30, a left conical basket 40, a right conical basket 50, a left inner collar 60, a right inner collar 61, a left outer collar 62, a right outer collar 63, a left mounting bracket 64, and a right mounting bracket 65. The left conical basket and right conical basket are more precisely "frustoconical" in shape (a frustum is a cone with its upper end cut off by a plane parallel to the base). However, the term "conical" is used herein for simplicity. The components of the tamping wheel are all made of durable malleable materials, preferably steel. The components of the tamping wheel are discussed in detail below.

2. The Spindles

Figure 6:
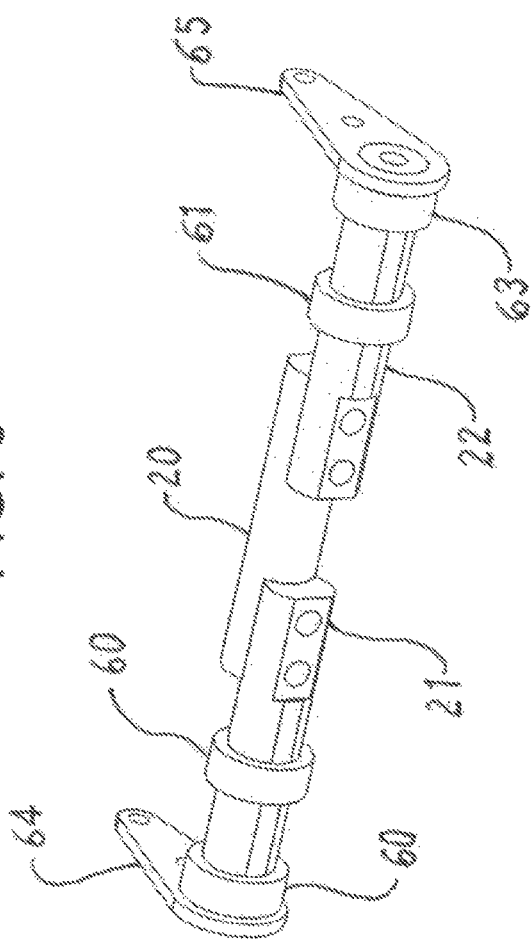
FIG. 6 is a perspective view of the spindle thereof.
Figure 7:
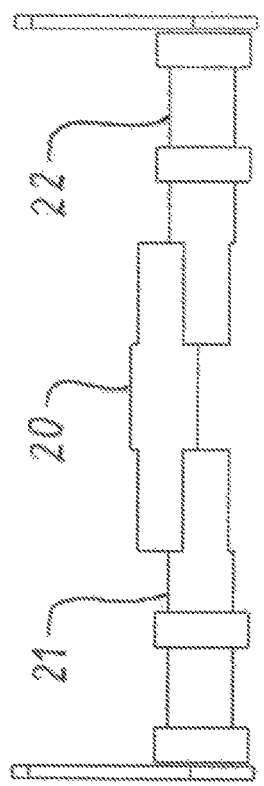
FIG. 7 is a top plan view thereof.

Referring now to FIGS. 6 and 7, the tamping wheel contains a center spindle 20, a left spindle 21, and a right spindle 22. The three spindles are connected together with screws or other suitable fasteners. The left and right spindles are in the same horizontal axis (collinear) while the center spindle is offset (in a different horizontal axis). The spindles are stationary during use. In other words, they do not rotate. The rotational position of the center spindle relative to the left and right spindles is adjustable throughout 360 degrees when the tamping wheel is installed on a farm implement. In other words, the spindles can be positioned with the center spindle on top, rotated 180 degrees so the center spindle is at the bottom, rotated 90 degrees toward the rear (as shown in FIGS. 6 and 7), rotated 90 degrees toward the front, or at any other position. As explained below, the position of the center spindle relative to the left and right spindles determines the height of the berm created.

3. The Baskets

The tamping wheel contains three baskets, a center basket 30, a left conical basket 40, and a right conical basket 50. The baskets are so named because their tamping members define an enclosed area. The left conical basket and the right conical basket are more precisely in the shape of truncated cones (also known as conical frustums) rather than true geometric cones in that they converge to a plane rather than to a point.

The center basket contains at least one disc that freely rotates on the center spindle and is perpendicular to the center spindle. Equivalent structures to a disc, such as a hub and spokes, are also suitable. In the preferred embodiment, the center basket contains two parallel discs 31 and 32, each of which contains a centrally located sleeve opening to accommodate the center spindle. In the preferred embodiment, the two discs are held in position on the center spindle by the offset side spindles. Mounted transversely on the outside edges of the two discs are a plurality of horizontal tamping members 33. In the preferred embodiment, the outer edge is serrated (contains recesses) that provide enhanced anchoring of the tamping members. The tamping members are preferably straight bars, but curved bars are suitable as are members having a non-circular cross section. As will be seen, the horizontal tamping members of the center basket create the center portion of the berm.

The left conical basket 40 of the preferred embodiment contains an inner ring 41 and an outer ring 42 which rotate together freely on the left spindle. The inner ring and outer ring are parallel to each other and are each perpendicular to the left spindle. The circumference of the inner ring is less than the circumference of the outer ring. The circumference of the inner ring is preferably about equal to or less than the circumference of the disc(s) of the center basket. The circumference of the outer ring is preferably greater than the circumference of the disc(s) of the center basket. Both rings contain centrally located openings to accommodate the left spindle. While two rings are preferred for providing two points of attachment of the tamping members, one or more can be omitted if other structures provide the necessary structural rigidity to the tamping members.

Mounted transversely on the outside edges of the two discs are a plurality of inwardly converging transverse tamping members 43. The angle made by the inwardly converging tamping members determines the angle of the sides in the berm that is created. In the preferred embodiment, the outer edges of both rings are serrated (contain recesses) that provide enhanced anchoring of the tamping members. The tamping members are preferably straight bars, but curved bars are suitable as are members having a non-circular cross section. As will be seen, the inwardly converging tamping members create the angled sides of the berm.

The right conical basket 50 of the preferred embodiment is identical to the left basket and contains an inner ring 51, an outer ring 52, and tamping members 53.

4. The Collars and Brackets

The left inner collar 60 and the left outer collar 62 hold the left conical basket in the desired position. The left inner collar and the left outer collar are mounted on the left spindle with set screws or the like (not shown). In the same manner, the right inner collar 61 and the right outer collar 63 hold the right conical basket in the desired position.

The left bracket 64 and the right bracket 65 are used to attach the tamping wheel to a farm implement. The attachment locks the spindles in position. in other words, the attachment does not allow the spindle to rotate during use.

5. Assembly and Use

The preferred embodiment of the tamping wheel is assembled by first positioning the center basket on the center spindle and then connecting the left and right spindles to the center spindle. The left and right spindles lock the center basket in position. The left and right inner collars are then slid upon the left and right spindles and secured at the desired locations. The distance between the inner collars, and the resulting distance between the left and right baskets, determines the width of the berm that is created. The left and right conical baskets are then slid upon the left and right spindles. The left and right outer collars are then slid upon the left and right spindles. The left and right brackets are then mounted.

Figure 5:
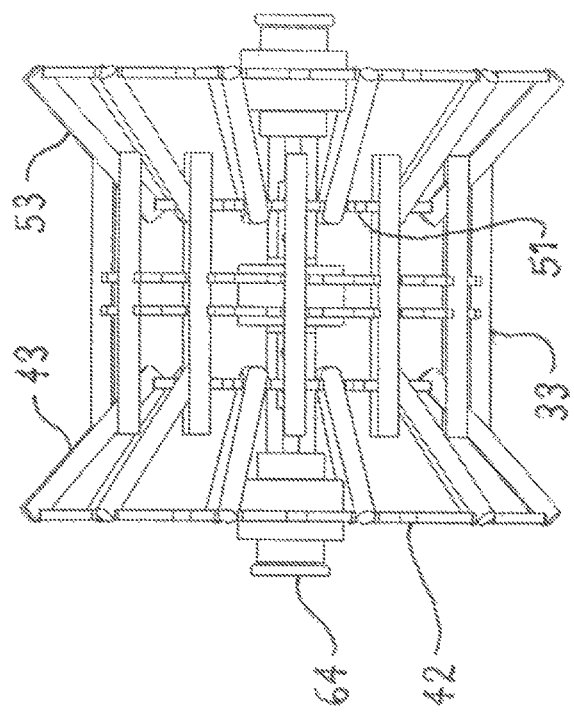
FIG. 5 is a front elevation view thereof.
Figure 4:
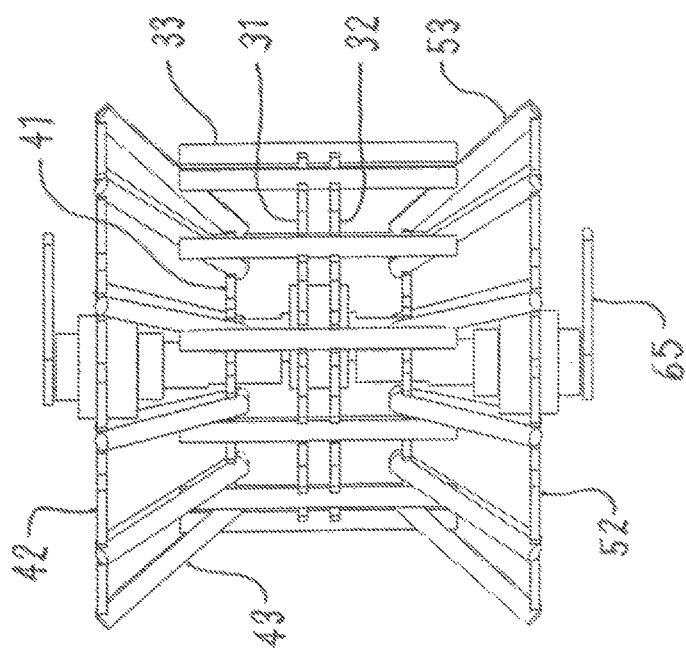
FIG. 4 is a top plan view thereof.

The tamping wheel is then mounted in the desired orientation on the farm implement. As a result of the center spindle being offset from the left and right spindle, the inner basket rotates on an axis that is offset from the axis on which the left an right baskets rotate. This, in turn, is responsible for the varying distance between the tamping members of the center basket and the tamping members of the left and right baskets, as best seen in FIGS. 4 and 5. In the orientation shown, the center spindle and the center basket are offset to the rear. In this orientation, the distance between the tamping members of the center basket and the tamping members of the left and right baskets are at a midpoint and the resulting berm if of medium height.

The tamping wheel of this invention is used whenever it is desirable to create a berm of a desired cross section over a recently filled trench. The term "recently filled" means that the dirt or soil is capable of being tamped into the desired cross section. A berm that has sat for a long time tends to harden and is more difficult to tamp. The tamping wheel typically passes over the berm immediately after it is formed and creates the desired cross section.

Figure 8:
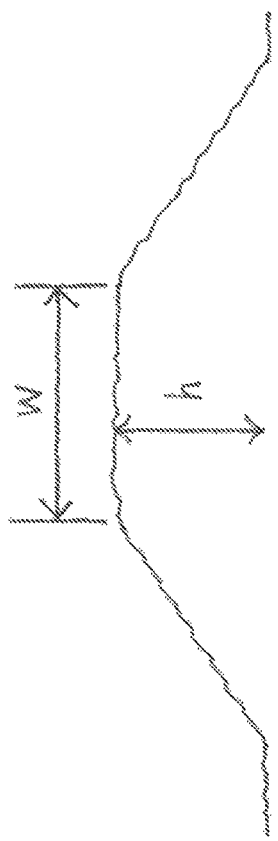
FIG. 8 is a cross sectional view of a first berm created by the tamping wheel.
Figure 9:
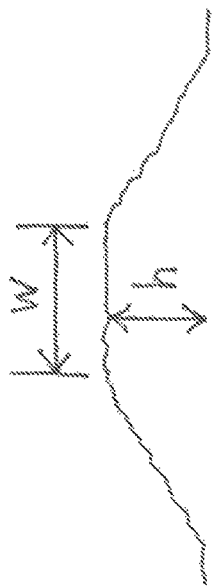
FIG. 9 is a is a cross sectional view of a second berm created by the tamping wheel.

Referring now to FIG. 8, a berm having a relatively large height (indicated by the reference character "h") and a relatively large width (indicated by the reference character "w") is created by assembling the tamping wheel with the maximum distance between the left and right conical baskets and by mounting the tamping wheel with the left and right spindles directly below the center spindle so the center spindle (and the attached center basket) are at their maximum elevations. Referring now to FIG. 9, a berm having a relatively low height and a relatively small width is created by minimizing the distance between the left and right conical baskets and by mounting the tamping wheel with the left and right spindles directly above the center spindle so the center spindle (and the attached center basket) are at their minimum elevations.

I claim:

1. An adjustable tamping wheel for forming a berm of a desired cross section over a filled trench, the tamping wheel comprising:
   (a) a center spindle defining a first horizontal axis;
   (b) an offset left spindle attached to the center spindle and defining a second horizontal axis that is different from the first horizontal axis;
   (c) an offset right spindle attached to the center spindle and being in the second horizontal axis defined by the left spindle;
   (d) a freely rotating center basket on the center spindle, the center basket comprising: (i) a disc defining a plane perpendicular to the horizontal axis defined by the center spindle, the disc having an outer edge and a circumference; and (ii) a plurality of horizontal transverse tamping members attached along the outer edge;
   (e) a freely rotating left conical basket on the left spindle, the left basket comprising: (i) an inner ring having an outer edge with a circumference less than the circumference of the disc of the center basket; (ii) an outer ring having an outer edge with a circumference greater than the circumference of the disc of the center basket; and (iii) a plurality of inwardly converging transverse tamping members extending from the outer ring to the inner ring;
   (f) a freely rotating right conical basket on the right spindle, the right basket comprising: (i) an inner ring having an outer edge with a circumference less than the circumference of the disc of the center basket; (ii) an outer ring having an outer edge with a circumference greater than the circumference of the disc of the center basket; and (iii) a plurality of inwardly converging transverse tamping members extending from the outer ring to the inner ring; and
   (g) a means for adjustably fixing the distance between the left conical basket and the right conical basket.

2. An adjustable tamping wheel for forming a berm of a desired cross section over a filled trench, the tamping wheel comprising:
   (a) a center spindle defining a first horizontal axis;
   (b) an offset left spindle attached to the center spindle and defining a second horizontal axis that is different from the first horizontal axis;
   (c) an offset right spindle attached to the center spindle and being in the second horizontal axis defined by the left spindle;
   (d) a freely rotating center basket on the center spindle, the center basket comprising a plurality of horizontal transverse tamping members;
   (e) a freely rotating left conical basket on the left spindle, the left basket comprising a plurality of inwardly converging transverse tamping members;
   (f) a freely rotating right conical basket on the right spindle, the right basket comprising a plurality of inwardly converging transverse tamping members; and
   (g) a means for adjustably fixing the distance between the left conical basket and the right conical basket.

* * * * *